(12) United States Patent
Wnuk

(10) Patent No.: US 6,979,090 B1
(45) Date of Patent: Dec. 27, 2005

(54) BLIND SPOT FREE MIRROR

(76) Inventor: Vladimir I. Wnuk, 10 W. 15th St., New York, NY (US) 10011

( * ) Notice: Subject to any disclaimer, the term of this patent is extended or adjusted under 35 U.S.C. 154(b) by 0 days.

(21) Appl. No.: 10/688,695

(22) Filed: Oct. 20, 2003

(51) Int. Cl.7 ................................................ G02B 5/10
(52) U.S. Cl. .................................................... 359/868
(58) Field of Search ............................... 359/841, 851, 359/855, 872, 864–868, 265, 267

(56) References Cited

U.S. PATENT DOCUMENTS

| | | | | |
|---|---|---|---|---|
| 3,563,638 A | * | 2/1971 | Panozzo | ...................... 359/864 |
| 5,005,962 A | * | 4/1991 | Edelman | ...................... 359/864 |
| 5,517,367 A | * | 5/1996 | Kim et al. | ................... 359/864 |
| 6,522,451 B1 | * | 2/2003 | Lynam | ....................... 359/265 |

\* cited by examiner

*Primary Examiner*—Euncha P. Cherry
(74) *Attorney, Agent, or Firm*—Jeffrey K. Seto

(57) ABSTRACT

A mirror that, when used as a side view mirror, greatly increases the driver's field of view and eliminates the blind spot that is inherent in traditional side view mirrors. The mirror comprises two halves, the first half consisting of a plane mirror and the second half being a mirror with a convex shape. The plane mirror can be used to view other vehicles at a distance. The half with the convex shape is used to view vehicles that are close to the driver's vehicle. The increased field of view, and elimination of the blind spot, makes lane changes safer for the driver and other vehicles on the road.

5 Claims, 2 Drawing Sheets

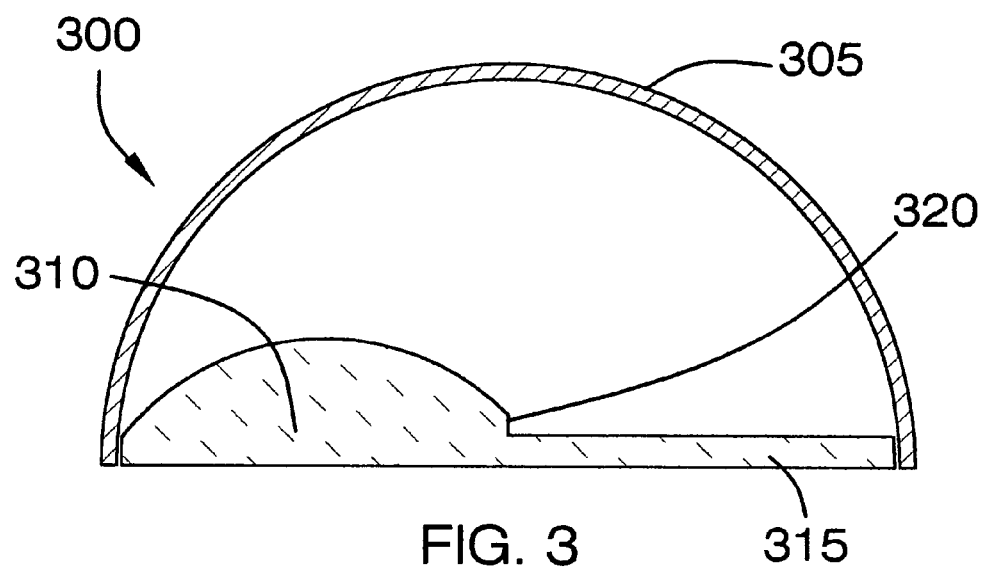
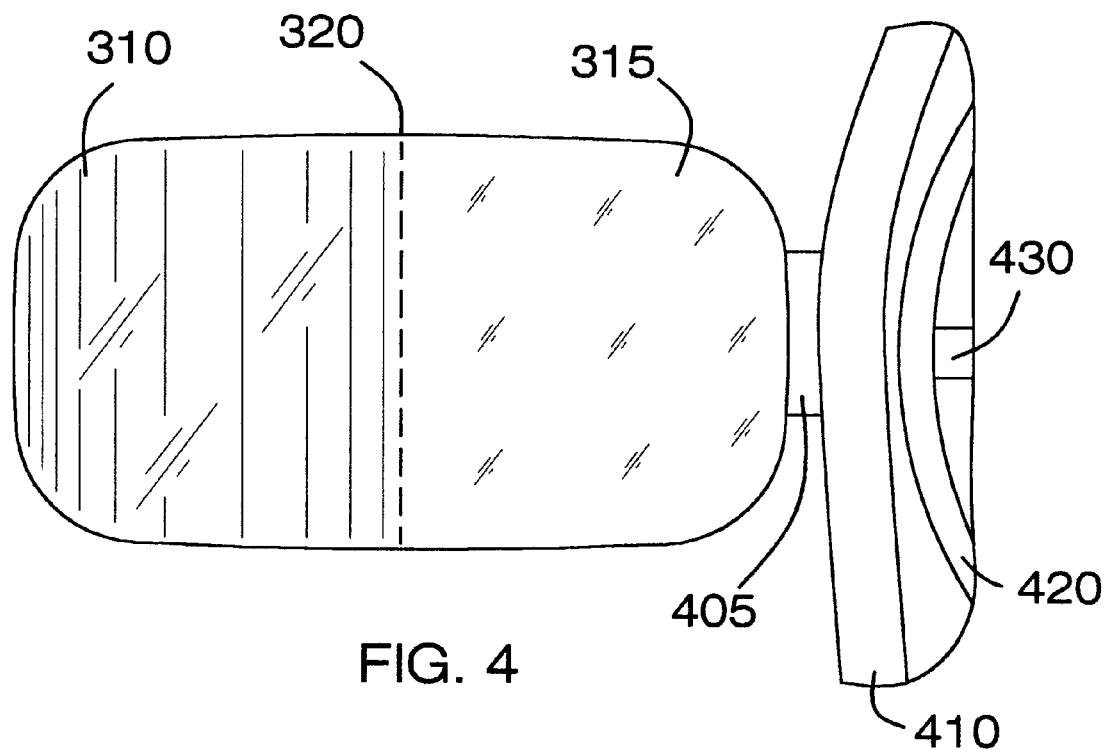

BLIND SPOT FREE MIRROR

BACKGROUND OF THE INVENTION

The present invention relates generally to side view mirrors for motor vehicles and more specifically to a side view mirror that greatly reduces the blind spot inherent in all side view mirrors.

Mirrors are optical devices, commonly made of glass, with a smooth, polished surface that forms images by the reflection of rays of light. A mirror is usually made of glass with a highly reflective metal deposit on the back. Plane, or flat, mirrors form a virtual image the same size as the object, but with left and right reversed. Parabolic mirrors have the shape of a parabola rotated about the parabola's axis of symmetry. Concave mirrors have a surface that resembles the interior of a hollow ball or sphere, and have traditionally been used in astronomical telescopes and automobile headlights to collect and focus light. Convex mirrors have a surface that resembles the exterior of a ball or sphere, and do not focus light as well as concave mirrors. Convex mirrors are however able to collect light from more sources than concave mirrors and plane mirrors. This characteristic of convex mirrors is exploited for a beneficial purpose in the present invention.

Crude forms of glass mirrors were first made in Venice in 1300. The original method of making glass mirrors consisted of backing a sheet of glass with an amalgam of mercury and tin. The surface was overlaid with sheets of tinfoil that were rubbed down smooth and covered with mercury. A woolen cloth was held firmly over the surface by means of iron weights for about a day. The glass was then inclined and the excess mercury drained away, leaving a lustrous inner surface. In the manufacture of mirrors today, in cases where this principle is utilized, the plate glass is cut to size, and all blemishes are removed by polishing with rouge. The glass is scrubbed and flushed with a reducing solution such as stannous chloride before silver is applied, and the glass is then placed on a hollow, cast-iron tabletop, covered with felt, and kept warm by steam. A solution of silver nitrate is poured on the glass and left undisturbed for about 1 hour. The silver nitrate is reduced to a metallic silver and a lustrous deposit of silver gradually forms. The deposit is dried, coated with shellac, and painted. In other methods of mirror production, the silver solution is added with a reducing agent, such as formaldehyde of glucose. Silvering chemicals are often applied in spray form. Special mirrors are sometimes coated with the metal in the form of vapor obtained by vaporizing silver electrically in a vacuum. Large mirrors are often coated with aluminum in the same way.

In addition to their important household and scientific uses, mirrors are also an important part of every truck and automobile on the road today. In most vehicles, there are usually three mirrors that the driver uses to navigate properly. The rear view mirror is usually located in the center of the front windshield, in the interior of the vehicle. The other two mirrors are the side view mirrors, which are located on the left and right sides of the outsides of the vehicle. These outside mirrors assist the driver in seeing other vehicles, persons, or objects-behind him and to the right and left of the vehicle that the motorist would not otherwise be able to see.

In regards to the driver's side of the vehicle, the blind spot is the area of the lane next to the driver that is not reflected by his side view mirror. Traditional plane mirrors fail to capture the entirety of the lane-next to the driver and any possible vehicles that may be there. The unpleasant result of the blind spot is that vehicles cannot properly see one another when maneuvering in heavy traffic, often times leading to accidents. This is especially relevant to large trucks where the blind spot is larger than in smaller vehicles.

The present invention solves this dangerous problem by providing a side view mirror that eliminates the blind spot thereby greatly increasing driver safety.

SUMMARY OF THE INVENTION

A bi-focal side view mirror that is adapted to be attached to the side of a vehicle, such as a truck or automobile. The bifocal side view mirror has a portion that provides an increased field of view to the driver, thereby eliminating the blind spot that is inherent in the use of side view mirrors. The side view mirror comprises, a mirror with a front, a back, a left, and a right sides, and a means for attaching the mirror to the vehicle. The front side of the mirror is divided into a flat half and a convex half, the flat half having a flat surface and the convex half having a convex shaped surface. The mirror, including the flat half and the convex half, is preferably produced from a single piece of glass. An optional transparent cover that arches across the front of the mirror may also be attached to the left and right sides of the mirror. The convex half may also include a small warning that images are closer than they appear.

It is an object of the present invention to provide a side view mirror that eliminates the driver's blind spot

BRIEF DESCRIPTION OF THE DRAWINGS

The invention of the present application will now be described in more detail with reference to the accompanying drawings, given only by way of example, in which:

FIG. 3 is a cross-sectional view of the present side view mirror with cover; and, FIG. 4 is a frontal view of the present mirror in its operational location.

DETAILED DESCRIPTION OF THE INVENTION

Figure 1:
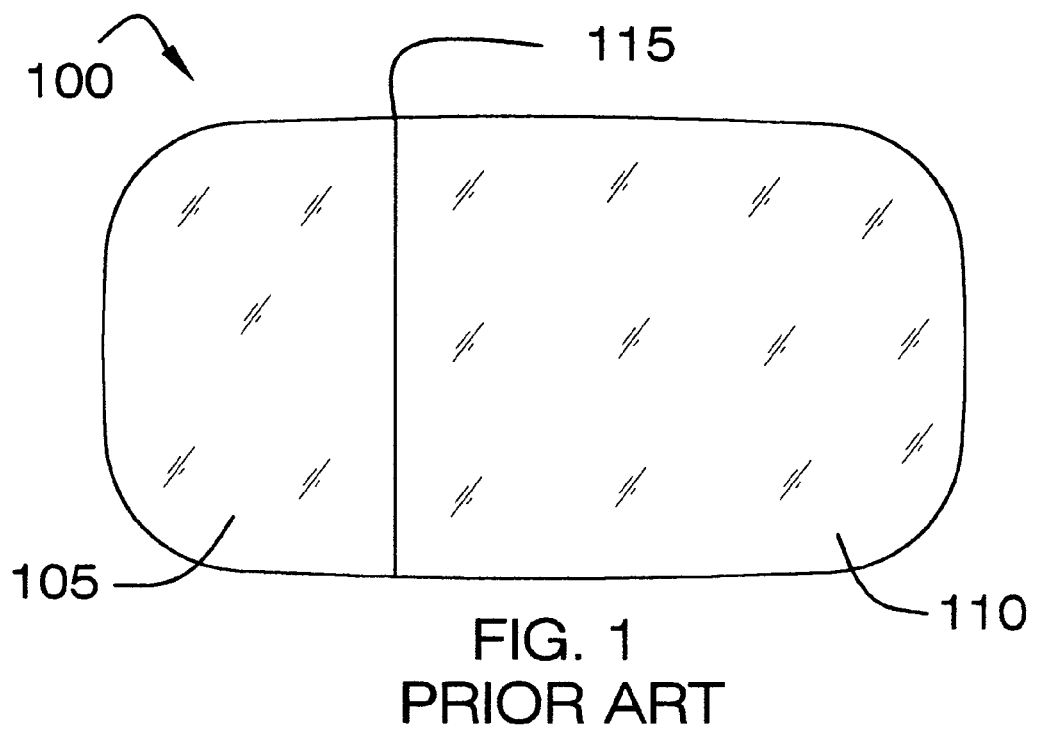
FIG. 1 is a frontal view of a prior art side view mirror.

FIG. 1 shows the front of a prior art side view mirror 100, which is comprised of two sections 105 and 110. A clear dividing line 115, which acted as a distraction to drivers, is visible in prior art mirror 100. Section 105 of the mirror 100 was intended to provide an increased viewing area to the driver, however the increased vision was slight and distorted. Section 105 was also traditionally relegated to a small area of the mirror 100. Section 110, which is a plane mirror, dominated the front of the mirror 100. The manufacturers knew that the plane mirror was the section, 110, that drivers preferred to use. Thus, the plane mirror section 105 was intentionally made so that it occupied the vast majority of prior art mirror 100.

Figure 2:
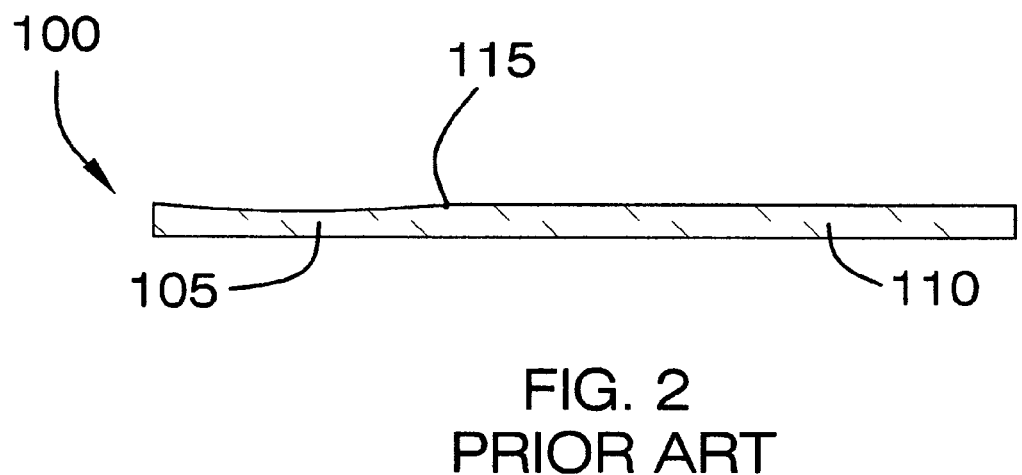
FIG. 2 is a side view of a prior art side view mirror.

FIG. 2 shows a side view of prior art mirror 100. From this angle it can be seen that the thickness in both sections 105 and 110 of the mirror 100 are substantially equal. Further, the modifications, of any kind, that were done to section 105 of prior art mirrors were insignificant and resulted in more of a distraction than an aid to drivers.

FIG. 3 shows a cross section of the preferred embodiment of the present side view mirror 300 with optional cover 305. Cover 305 is transparent and protects the reflective surfaces, sections 310 and 315, of the mirror 300. The surface of section 310 is visibly convex in nature and is designed to eliminate the traditional blind spot that is inherent in side view mirrors. The convex shape of section 310 provides drivers with an expanded view to the driver's side of the vehicle, which greatly increases safety for all drivers. Section 315, which shares a common border 320 with section 310, comprises a traditional plane mirror. The plane mirror section 315 occupies substantially the same surface area of the mirror 300 as the convex section 310. Plane mirror section 315 provides the driver with virtual images that are the same size as the objects, but with left and right sides reversed. Convex section 310 provides the driver with an increased field of view that includes a substantial portion of the area immediately next to the drivers side of the vehicle. Convex section 310 thereby eliminating the traditional "blind spot" and provides the driver with a tremendous safety advantage over prior art modified mirrors. As such, drivers will likely use section 310 of the mirror at least as much as they use section 315. Thus convex section 310 intentionally covers approximately half of the surface area of mirror 300.

FIG. 4 shows the present side view mirror in its preferred operational position, on the drivers side of a vehicle, such as an automobile or truck. The steering wheel 420 and 430 of the vehicle can be seen from this view. Convex section 310 occupies the left half of the mirror and plane mirror section 315 occupies the right half of the mirror, with both sections meeting at common border 320. The mirror is attached to the vehicle by attachment means 405, which attaches to an exterior portion of the drivers side 410 of the vehicle.

The foregoing description of the specific embodiments will so fully reveal the general nature of the invention that others can, by applying current knowledge, readily modify and/or adapt for various applications such specific embodiments without departing from the generic concept. For example, the present mirror may also be used as a side view mirror on the passengers side of the vehicle. Therefore, such adaptations and modifications should and are intended to be comprehended within the meaning and range of equivalents of the disclosed embodiments. It is to be understood that the phraseology of terminology employed herein is for the purpose of description and not of limitation.

I claim:

1. An external mirror for a driver's side of a motor vehicle that provides two different views to a driver of the motor vehicle, the external mirror comprising:
    a flat half and a convex half, the flat half occupying a portion of the mirror that is closest to the driver and having a flat reflecting surface, wherein the flat half provides a normal view of objects close to the driver's side of the vehicle, and wherein the convex half occupies a portion of the mirror that is furthest away from the driver, the convex half having a reflecting surface that curves outward, the convex half providing an expanded view of objects to the driver's side of the vehicle, in relation to the view provided by the flat half, wherein the expanded view includes the normal view provided by the flat half, and further wherein the driver is able to clearly see objects in both halves of the mirror simultaneously so that there is no moment of distraction and no need for vision accommodation when the driver views objects in the mirror, wherein a highest point on the convex half is in a plane that is higher than a plane of the surface of the flat half, and a lowest point on the convex half is in a second plane that is also higher than the plane of the flat half of the mirror; and,
    a means for attaching the mirror to the side of the vehicle.

2. The side view mirror of claim 1, wherein the mirror, including the flat half and the convex half, is produced from a single piece of glass.

3. The side view mirror of claim 1, further comprising:
    a transparent cover that arches across the front of the mirror and is attached to a left side and a right side of the mirror.

4. The side view mirror of claim 1, wherein the vehicle is a car or a truck.

5. The side view mirror of claim 1, wherein a small warning is visible on the convex half of the front of the mirror that warns the driver that images are closer than they appear.

* * * * *